United States Patent [19]
Allyn et al.

[11] 4,065,421
[45] Dec. 27, 1977

[54] CONTINUOUS PROCESS FOR THE PRODUCTION OF AQUEOUS UREA-FORMALDEHYDE SOLUTIONS

[75] Inventors: Charles L. Allyn, Tacoma; James C. Manlove, Federal Way; Gerald M. Chang, Orting; Robert C. Burmark, Tacoma, all of Wash.

[73] Assignee: Reichhold Chemicals, Inc., White Plains, N.Y.

[21] Appl. No.: 667,702

[22] Filed: Mar. 17, 1976

[51] Int. Cl.² .............................................. C08L 61/24
[52] U.S. Cl. ............................. 260/29.4 R; 260/69 R; 260/95 C
[58] Field of Search ................ 260/29.4 R, 69 R, 95 C

[56] References Cited
U.S. PATENT DOCUMENTS

| | | | |
|---|---|---|---|
| 2,946,403 | 7/1960 | Krueger et al. | 260/72 R |
| 3,067,177 | 12/1962 | Greco et al. | 260/69 R |

Primary Examiner—Theodore E. Pertilla

[57] ABSTRACT

This invention relates to a process for the continuous production of aqueous urea-formaldehyde solutions having a mol ratio of formaldehyde to urea ranging from about 4.0 to about 6.0 and having a total solids content ranging from about 60% to about 85% by weight. This process utilizes a single multiple tray absorption column through which is passed the gaseous product from a formaldehyde converter counter current to a flow of aqueous urea solution. The column is maintained at a temperature ranging from about 40° C to about 80° C and dilute aqueous base is added at several points along the tower. Formaldehyde combines with the urea in the solution during their respective passages through the column to form the final product. A portion of the final product is circulated through the lower portion of the column.

11 Claims, 3 Drawing Figures

UREA FORMALDEHYDE ABSORBTION SYSTEM

UREA FORMALDEHYDE ABSORBTION SYSTEM

PROCESS FLOW DIAGRAM

CONTINUOUS PROCESS FOR THE PRODUCTION OF AQUEOUS UREA-FORMALDEHYDE SOLUTIONS

Our invention is directed to a continuous process for the production of high solids urea-formaldehyde solutions, i.e., also known as urea-formaldehyde concentrate and U-F concentrate. This process involves only a single formaldehyde absorber column normally used in conjunction with a methanol oxidation process for the production of formaldehyde and does not require extensive modification of the column. It is possible to switch from the production of urea-formaldehyde solution to the production of aqueous formaldehyde solution in a relatively short period of time.

Urea-formaldehyde concentrate is a clear liquid, stable at room temperature, comprising a mixture of water, urea, formaldehyde and low molecular weight urea-formaldehyde addition products. The use of this concentrate in place of or in addition to aqueous formaldehyde solutions for the production of urea-formaldehyde resins is well known. It provides many operating advantages over the conventional method of making urea-formaldehyde resins from urea and 50% aqueous formaldehyde solution including elimination of distillation of excess water from each batch (thus shortening the batch cycle), using less energy, and eliminating a particularly dirty waste stream which requires treatment. U-F concentrate has become a valuable raw material and is an important commercial commodity. The urea-formaldehyde concentrate produced by the practice of this invention may be used in all currently practiced processes requiring the use of urea-formaldehyde concentrate.

Urea-formaldehyde concentrate may be described chemically as a solution of low molecular weight urea-formaldehyde addition products in water resulting from the reaction of urea with formaldehyde. It is most convenient to define urea-formaldehyde concentrate by its equivalent compositions of urea, formaldehyde and water. In practice, it is common to characterize urea-formaldehyde concentrate by the mol ratio of formaldehyde to urea and the total solids content which is equivalent to the total weight percents of the urea and formaldehyde.

Preferably our invention comprises a continuous process for the production of aqueous urea-formaldehyde solutions having a mol ratio of formaldehyde to urea ranging from about 4.0 to about 6.0 and having a total solids content ranging from about 65% to about 85% by weight comprising (A) introducing the gases from a formaldehyde converter into the bottom of a single formaldehyde absorber column and (B) allowing said gases to pass upwardly through said column while (C) simultaneously feeding an aqueous solution of urea containing from about 40% to about 80% by weight of urea into the top stage of said column and (D) allowing said aqueous solution of urea to at least partially react with the $CH_2O$ in said gases to form an aqueous solution of low molecular weight urea-formaldehyde addition products while flowing down said column from stage to stage at a temperature ranging from about 25° C to about 80° C while (E) simultaneously feeding a dilute aqueous solution of base into said column at a multiple of points such that the pH of said aqueous solution of methylol-ureas is maintained at a pH ranging from about 6.0 to 9.0 and (F) collecting said aqueous solution of methylol-ureas in the bottom of said column (G) circulating a portion of said aqueous solution of urea-formaldehyde addition products from the bottom of said column back into said column at a point above the last point where the dilute aqueous base is being fed into said column and above the point where said gases are being introduced but below the top stage of said column (H) continuously removing the remainder of said aqueous solution of urea formaldehyde addition products from the bottom of the said column (I) while continuing to feed said aqueous solution of urea into the top stage of said column while (J) continuing to introduce said gases into the bottom of said column.

More specifically my improved process comprises a continuous process for the production of aqueous urea formaldehyde solutions having a mol ratio of formaldehyde to urea ranging from about 4.0 to about 5.0 and having a total solids content ranging from about 72% to about 78% by weight comprising (A) continuously introducing the gases coming from a methanol oxidation converter for the production of formaldehyde into the bottom of a single formaldehyde absorber column containing from about 20 bubble-cap trays to about 30 bubble-cap trays numbered from 1 beginning with the bottom tray and equipped with internal cooling coils on each tray (B) allowing said gases to pass upwardly from below the first tray through said column while (C) simultaneously feeding an aqueous solution of urea containing from about 45% to about 60% by weight of urea and from about 55% to about 40% by weight of water at a temperature ranging from about 25° C to about 70° C continuously into the top tray of said column and (D) allowing said aqueous solution of urea to at least partially react with the $CH_2O$ in said gases on each tray to form an aqueous solution of low molecular weight methylol ureas solution while flowing down said column from tray to tray while maintaining a tray temperature ranging from about 50° C to about 70° C for the bottom tray and from about 25° C to about 50° C for the top tray while (E) simultaneously feeding a dilute aqueous solution of base into said column at a multiple of points such that the pH of said aqueous solution of urea formaldehyde addition products is maintained at a pH ranging from about 7.0 to about 8.5 (F) collecting said aqueous solution of urea formaldehyde addition products in the bottom of said column (G) circulating a portion of said aqueous solution of urea formaldehyde addition products from the bottom of said column back into said column at a single point ranging from tray 4 to tray 8 (H) continuously removing the remainder of said aqueous solution of urea formaldehyde addition products from the bottom of said column while (I) continuing to feed said aqueous solution of urea onto the top tray of said column while (J) continuing to introduce said gases into the bottom of said column.

In the above process the temperature of the bottom tray is preferably about 55° C to about 70° C and the temperature of the top tray ranges from about 35° C to about 55° C.

If desired, the absorber may contain sieve trays instead of bubble-cap trays.

In the above process, the total solids content of the aqueous urea-formaldehyde solution preferably ranges from about 75% to 77% by weight.

THE PRIOR ART

The prior art discloses a continuous process in U.S. Pat. No. 3,067,177, patented Dec. 4, 1962 and assigned to Montecatini, Milan, Italy. In this process, the gas stream from a formaldehyde converter is first scrubbed in a packed column with a recirculating solution containing formaldehyde, urea and water and then passed through a second bubble-cap-plate column fed from the top with a separate aqueous urea solution. A portion of the stream collected in the bottom of the first column is withdrawn as product while the remainder as well as the material collected from the second column is combined and is recirculated to the top of the first column. This process suffers from the disadvantage of requiring two columns, a mixing tank and a recirculation pump to accommodate the process. It will be shown that the process can be accomplished in far less equipment than indicated by their process. Additionally, the process can be accomplished in equipment normally designed for formaldehyde absorption with very little modification.

IN THE DRAWINGS

DESCRIPTION OF THE INVENTION

What has now been disclosed is a simple continuous process for the production of aqueous urea-formaldehyde solutions which have a mol ratio of formaldehyde to urea of about 4.0 to about 6.0 with a total solids content ranging from about 60% to about 85%. This process consists of taking the gases from a formaldehyde converter and feeding them into a single absorber column in a conventional manner while at the same time feeding an aqueous solution of urea into the top tray of the column. The urea solution will flow from tray to tray down the column while at least partially reacting with the formaldehyde in the gases passing up through the column to form an aqueous solution of low molecular weight formaldehyde-urea addition products. The concentration of the urea-formaldehyde addition products will increase as the solution continues down the column and as the concentration of formaldehyde decreases in the gases passing up the column. As the solution flows down the column, dilute aqueous base is fed into the column at a number of points so as to maintain the pH of the solution in the column at 6.5 to 9.5. The final product is collected at the bottom of the absorber column and a portion is recirculated back into the column a few trays above the bottom. Product is continuously removed to storage while the aqueous solution of urea is fed into the top tray and the formaldehyde containing gases are fed into the bottom of the column.

Figure 1:
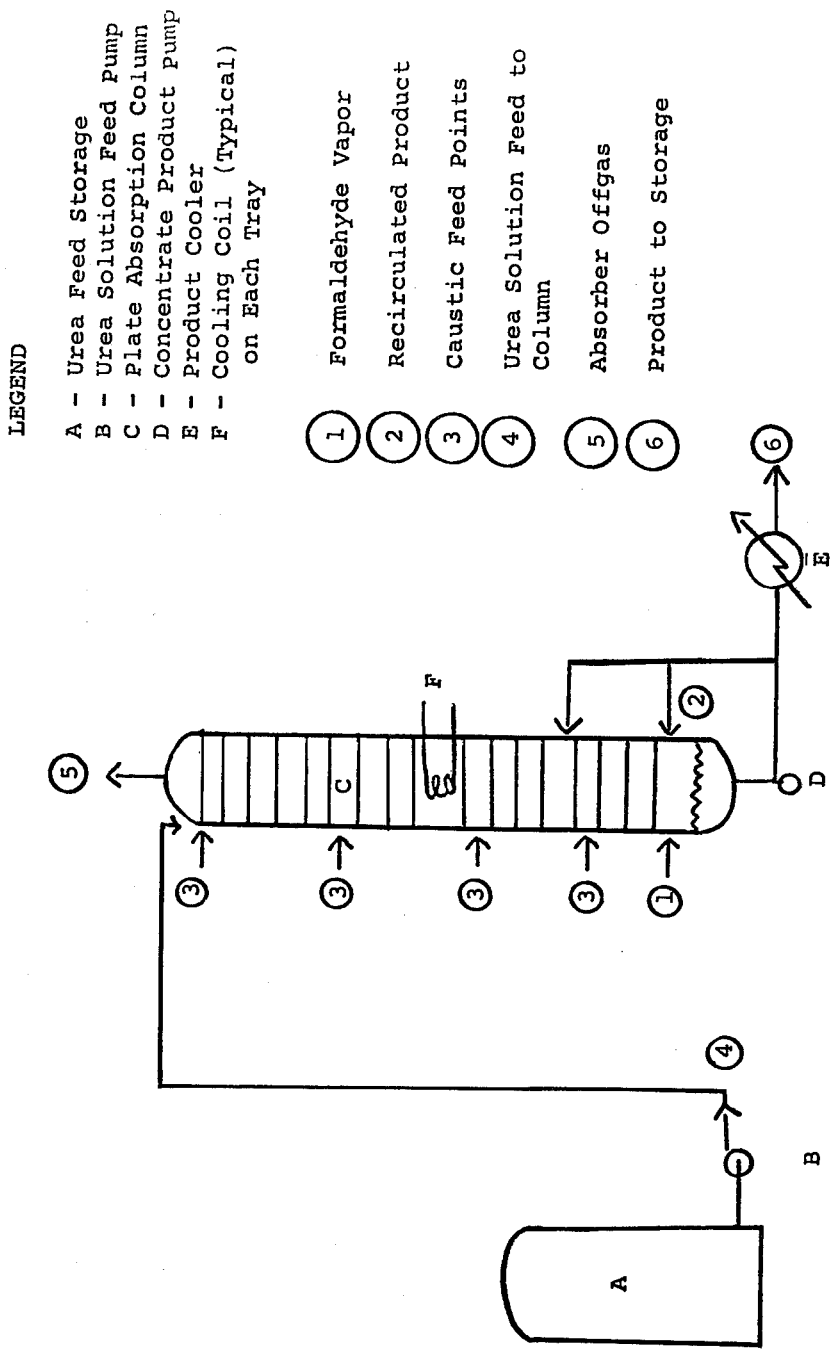
FIG. 1 is a simplified diagram illustrating my invention.
Figure 2:
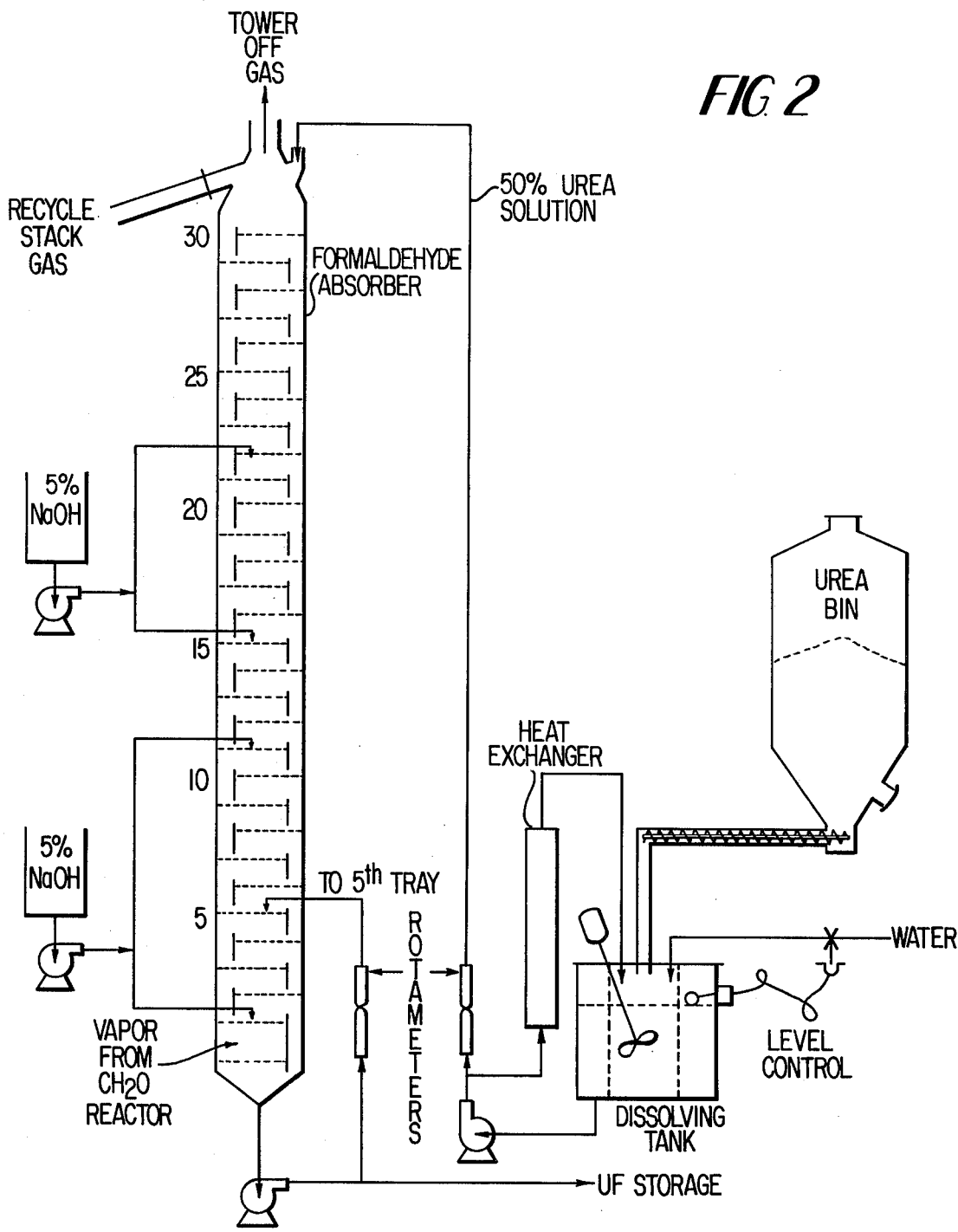
FIG. 2 is a diagrammatic view of a urea formaldehyde absorbtion system embodying my invention.
Figure 3:
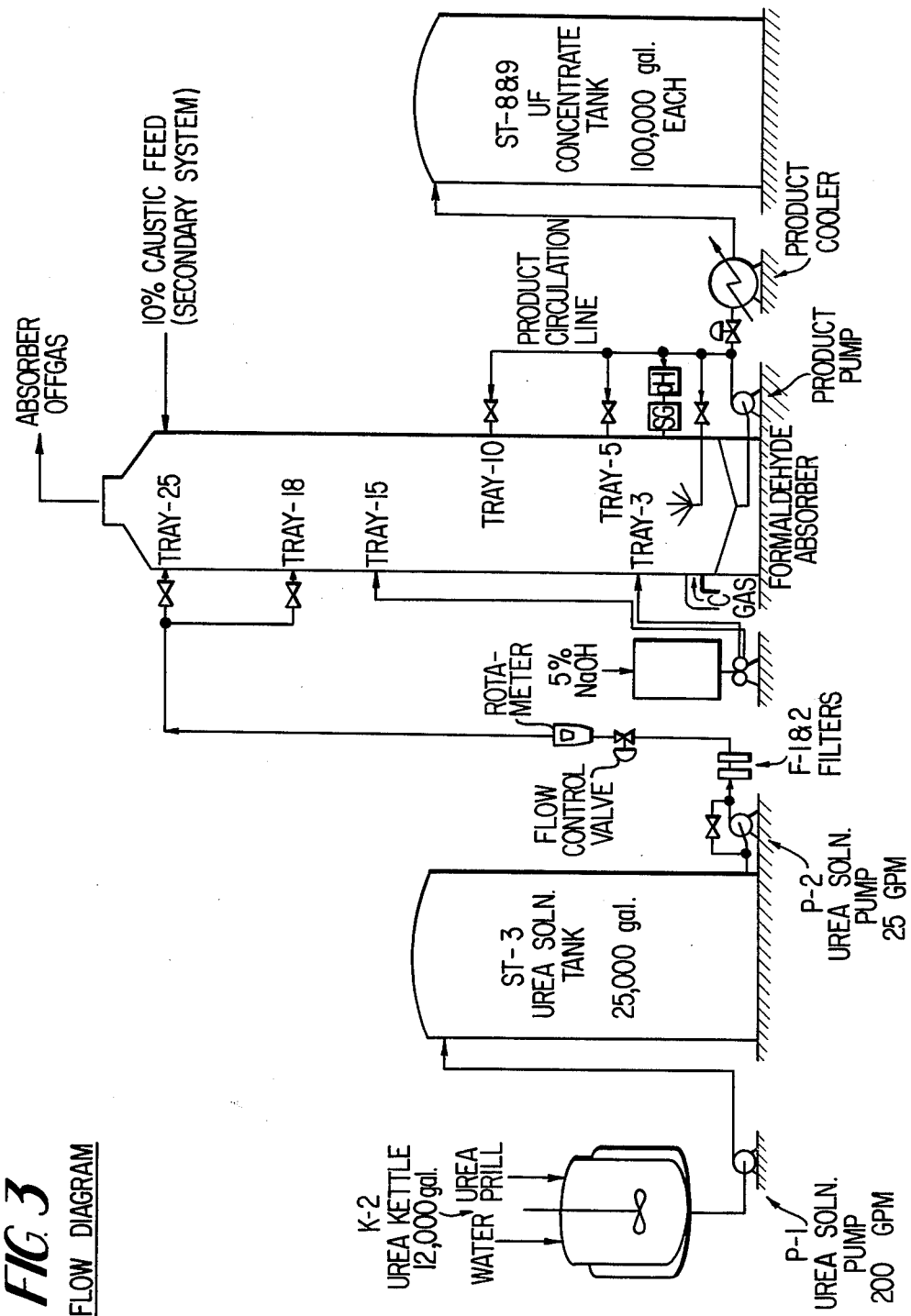
FIG. 3 is a process flow diagram illustrating the invention.

This new continuous process provides for an efficient means of making urea-formaldehyde concentrate using only a single formaldehyde absorber column. Furthermore, formaldehyde losses in the absorber off gases are reduced. These and other advantages will become apparent through the following detailed description and examples. Reference will be made to FIG. 1 the accompanying drawing. Typically, a 50-60% by weight aqueous urea solution is made up in a urea solution kettle and then transferred in a large storage tank. The urea solution is metered out of this tank into the top of the absorber. The flow of the urea solution is controlled at a rate equal to the amount required to make the product desired. The solution is allowed to flow down the column from tray to tray while gases from the formaldehyde converter enter the bottom of the absorber as in normal operation for the production of aqueous formaldehyde solution. The product stream, i.e., urea-formaldehyde concentrate, is pumped from the bottom of the absorber to a storage tank as in normal formaldehyde production except that a portion is also recirculated to one of the lower trays of the absorber. This has the effect of making the bottom and the first several trays of the absorber a completely mixed reactor in which the urea solution, cascading from the trays above, react with the formaldehyde containing gases from the converters to form the UF concentrate. This technique provides sufficient residence time for the reaction to reach equilibrium. Some formaldehyde passes this zone as a vapor but it is absorbed in the urea solution on the trays above. UF concentrate is not stable for long periods when the mol ratio of formaldehyde to urea is between about 4.0 to 1.0 and 1.0 to 1.0. These unstable mixtures exist on the upper trays above the circulating mixture, but because most of the formaldehyde is being absorbed at the bottom where the concentration of formaldehyde is the greatest, these conditions only exist on a few trays. The residence time is short enough on these upper trays so that precipitates are not formed.

One of the conditions necessary to the manufacture of UF concentrate is that the contents of the absorber must be maintained at a slightly alkaline pH. Acidic conditions in UF concentrate production favor the formation of insoluble products such as those formed during resin production with the result that precipitates are formed instead of a stable concentrate. For this reason the aqueous caustic solution is fed at multiple locations in the column to maintain a pH in excess of 6.5 and preferably in the range from 7.0 to 8.5, at all locations in the absorber. The most important point of measurement is in the bottom of the absorber.

The additional water introduced into the process with the 50% urea solution and the excess water from the methanol oxidation reaction must be removed if a high solids concentrate is to be produced. This is done by adjusting the cooling water flow to the absorber coils, and operating the column at a temperature at which the excess water is lost out the top of the absorber as a vapor. The controlling temperature is that on the top tray of the absorber. This should be between 40° C and 55° C depending on the strength of the product desired.

The UF concentrate made in the absorber is pumped to storage through the product cooler. The product should be stored near ambient temperature for maximum product stability as higher storage temperatures tend to cause the pH to drift down with time toward the unstable region. By this process, the amount of formaldehyde in the absorber off gas is reduced to about 10 to 100 parts per million as compared to amounts ranging from about 200 to 400 ppm on a normal formaldehyde absorber. This demonstrates the efficiency of the process. Also, air contamination is reduced since normally this amount of formaldehyde is merely lost to the atmosphere.

An important feature of this invention is the addition of dilute aqueous base at multiple points along the column. Improved absorption efficiency throughout the column depends in large part upon the pH of the solution. Maintaining a constant pH between 7.0 and 8.5 throughout the absorber column with multiple caustic addition points helps to obtain a high absorption efficiency and good process solution stability. In the prior art, with only one addition point of caustic solution, the absorption efficiency is probably not as great throughout the columns, because the pH would tend to decrease from the top to the bottom of the columns.

The formaldehyde column design may be any one of those currently in service but preferably of the bubble-cap or sieve plate type. It has been found that about 25 bubble-cap trays are adequate for this process, although a smaller or greater number could be used. Ballast absorber trays or sieve trays may be used in place of bubble-cap absorber trays as long as their total absorption capacity is equal to that of the bubble-cap tray design. Trays should be equipped with cooling coils.

Column temperatures may range from about 25° C at the top tray to about 50° C while the bottom tray temperature should range from about 50° C to about 80° C.

Aqueous urea solution is prepared and fed onto the top tray of the absorber. The concentration of urea, by weight, ranges from about 45% to about 80% with about 50% preferred. The temperature of the urea solution as fed ranges from about 35° C to about 50° C.

As previously stated, aqueous base is fed into the column at multiple points. The exact number of points will depend upon the number and type of trays. For instance, in a 30 bubble-cap tray absorber column, base is fed onto trays 1, 11, 15 and 22. In a 25 bubble-cap tray column, base is fed onto trays 3, 15 and 25. The exact trays onto which base will be fed must be determined on the individual column, but the important fact is that the pH throughout the column must range from about 6.5 to about 8.5 and preferably between 7.0 and 8.5. This is important in order to use just a single absorber column. The aqueous base may be sodium hydroxide, potassium hydroxide or the like and the aqueous solution may range from about 1% to about 20% by weight of the caustic material.

Finished product is recirculated from the bottom of the column back up into the column to a tray above the lowest point of addition of the aqueous base, preferably between trays 4 and 8. In addition, finished product is recirculated to a point in the column immediately above the level of liquid in the bottom, the purpose of which is to cool and absorb the hot gases entering from the converter. The majority of the finished product is recirculated to the column. A lesser amount is drawn off from the bottom and transferred to storage, maintaining a constant level in the bottom of the absorber.

This invention will be more readily understood by reference to the accompanying specific examples which are intended as illustrations only rather than as limiting the invention except as defined in the accompanying claims.

EXAMPLE 1

Urea-formaldehyde concentrate was made in a 5-day test run in the absorber of a conventional formaldehyde plant. The absorber was a 30 bubble-cap tray absorber, 6 ft. in diameter equipped with internal cooling coils on each tray. The equipment added to the absorber for the test was:
1. 4 metering pumps for supplying 5% sodium hydroxide to the absorber.
2. A large urea prill bin, variable rate screw feeder, urea dissolving tank, urea solutions pump, heat exchanger, flow meter and transfer line to the top of the absorber.
3. A recirculating line from the bottom take-off line to tray 5 of the absorber.

Normal formaldehyde storage tanks were used for product storage. For the purposes of this test run, product was not cooled in a heat exchanger before storage. FIG. II is a diagram of the equipment used during the test.

The UF concentrate run was started with the formaldehyde plant running normally. The formaldehyde product stream was recycled to the 5 th tray throughout the run. Caustic was started at a high rate to trays 1, 5, 15 and 24 and monitoring of the tray pH's was started. When all points in the column showed pH levels above 7, urea solution was started to the top of the column. The temperature of the top tray was adjusted to 48° C. Simultaneously, bottoms product, which had been going to the normal formaldehyde tank, was diverted to the UF concentrate product tank. Samples of the product during this period turned to paraformaldehyde when cooled, an effect promoted by the high pH. As urea began to increase in the product bottom, however, the product cleared. The startup portion of the run required about 32 hours from start of urea feed to normal operations, a much longer period than ordinarily required because of equipment problems. The process was maintained at steady state conditions for 72 hours. During this portion of the run, product was targeted for 75% solids and a formaldehyde-urea mol ratio of 4.2 to 1.0.

pH control in the column was satisfactory using the four metering pumps for caustic feed. The absorber trays were surveyed for pH about twice per shift during normal operation. The technique used was to sample the liquid on the tray immediately above the trays on which caustic was being fed and adjusting the caustic flows accordingly to maintain these points at a pH about 7. During the run, it became desirable to shift the feed locations of the caustic to equalize the pH in the column as much as practical. The final feed location at equilibrium conditions were on trays 1, 11, 15 and 22. Once steady conditions were achieved, very little change in tray pH was noted. A typical absorber pH profile was:

| Tray | 1   | 3   | 5   | 8   | 9   | 14  | 18  | 22   | 24  | 26  | 28  |
|------|-----|-----|-----|-----|-----|-----|-----|------|-----|-----|-----|
| pH   | 8.1 | 8.0 | 8.0 | 8.3 | 8.5 | 9.3 | 8.6 | 11.3 | 6.7 | 6.9 | 6.5 |

During the run, specific gravity and percent formaldehyde were the control tests. Urea analyses were run daily on retained samples from the previous 24 hours of operation as another check.

A tray-to-tray analysis was made on the absorber approximately 36 hours after normal operation began to determine absorption efficiency. Additional checks were made 24 hours after the first set to be sure the column conditions had come to complete equilibrium. The two sets agreed closely. Table I presents the data from this analysis with comparison data to normal formaldehyde absorption data. The high formaldehyde concentrate on trays 1-5 is due to the product recycle. The superior absorption of aqueous urea solution in the upper trays over normal formaldehyde production is apparent. Stack samples of the vapors leaving the top of the absorber were also taken. The formaldehyde concentration of this stream averaged 10.5 ppm during the normal operating period. This stream typically analyzes 300 ppm during normal formaldehyde production.

The formaldehyde yield over the entire run was 15.67 lbs. equivalent 37% formaldehyde per gallon of methanol consumed. This compares well with the pre-run average yield of 15.59 lbs./gal and post-run yield of 15.29 lbs/gal during normal formaldehyde production. The yield on methanol was 93.3% recovered as formaldehyde. The product remained stable in storage for approximately 4 weeks before being processed into resin with no significant pH drift from 7.5.

Table 1
A Comparative Tray Profile of Absorber

| Tray | Liquid Wt.% $CH_2O$ | Liquid Wt.% Urea | F/U | Gas Vol.% $CH_2O$ | Normal $CH_2O_1$ Production Liquid Wt.% $CH_2O$ | Normal $CH_2O_1$ Production Gas vol.% $CH_2O$ |
|---|---|---|---|---|---|---|
| Off Gas | — | — | — | — | — | — |
| 30 | — | — | — | — | — | — |
| 28 | 0.15 | 49.2 | — | 0.04 | 0.70 | — |
| 26 | 0.16 | 43.7 | — | — | — | 0.03 |
| 24 | 0.22 | 42.6 | — | — | 4.08 | 0.07 |
| 22 | 0.11 | 34.3 | — | — | — | 0.20 |
| 20 | 0.05 | 28.6 | — | — | — | 0.24 |
| 18 | 0.31 | 33.8 | — | 0.04 | 8.68 | 0.31 |
| 17 | — | — | — | 0.04 | — | 0.42 |
| 15 | — | — | — | 0.04 | — | 0.39 |
| 14 | 0.96 | 25.8 | 0.09 | 0.06 | 15.47 | 0.63 |
| 11 | — | — | — | 0.05 | — | 1.22 |
| 9 | 6.25 | 22.1 | 0.49 | 0.14 | 26.10 | 1.71 |
| 8 | 7.61 | 21.1 | 0.72 | 0.20 | — | 1.88 |
| 5 | 46.71 | 23.2 | 4.02 | 0.86 | 30.89 | 2.88 |
| 4 | — | — | — | 0.98 | 33.67 | 2.82 |
| 3 | 48.52 | 23.4 | 4.10 | 1.47 | 36.50 | 3.30 |
| 2 | — | — | — | 1.74 | 40.25 | 3.60 |
| 1 | 49.41 | 23.3 | 4.20 | 2.17 | 43.65 | 4.60 |
| Bot. | 50.5 | | | 5.08 | 51.25 | 6.24 |

EXAMPLE OF UFC PRODUCTION FOR PATENT APPLICATION

EXAMPLE 2

Urea-formaldehyde concentrate was made in another test run in the absorber of a larger conventional formaldehyde plant. This absorber was 16 ft. in diameter and contained 25 bubble-cap trays, each equipped with internal cooling coils. For the test, urea solution was made up at 52% concentration batchwise in an agitated, steam heated vessel and then transferred to a storage tank from which it was continuously pumped to the top of the absorber for normal operation. Caustic solution for the purposes of pH adjustment in the tower was prepared and then transferred to two vessels from which it was pumped to 3 locations in the tower by 3 variable rate diaphragm pumps. A recirculating line was installed from the bottom take-off line to tray 5 of the absorber. The product was pumped through a water cooler heat exchanger on the way to final storage. FIG. III is a diagram of the equipment used in the test.

The process was started up in a manner similar to Example 1. The product was recirculated to tray 5, and left this way throughout the run. Caustic feed was started at maximum rate to trays 3, 15 and 25, until the pH in the entire absorber was above 7. Urea solution was then started to the absorber at a high controlled rate until sufficient urea had been added to equal the approximate steady state urea inventory of the absorber. During this time, product was directed to a separate storage tank to avoid diluting the final product. The temperature within the absorber was slowly increased to near the final operating temperature. The product specific gravity slowly increased to the final steady state level of 1.285 and was controlled there by temperature adjustment for the remainder of the run. The startup phase, from initial pH adjustment to the start of product collection in the final storage tank required 10 hours. The product stream was cooled to 25° C in the product cooler. The process was run at steady state for 101 hours, during which time 1,008,000 lbs. of product was collected. During the test analyses were made of the principal variables. The process was fairly stable. The only significant control problem was in control of the product specific gravity. This was caused by the long dead time in the system between adjustment of the column temperature and the resulting change in product specific gravity. This led to overcontrol and a cycling product specific gravity, a condition which was corrected by limiting the frequency and magnitude of temperature changes. The process was shut down by shutting down the formaldehyde converters, and then washing the contents of the absorber to tankage. By this technique, losses of product and amount of diluted product were minimized. The final product tank analysis was 53.9% formaldehyde and 24.2% urea, or 4.45 urea-formaldehyde and 78.1% total solids. The yield on urea was 96.7% and the formaldehyde yield was 15.3 lbs. 37% equivalent formaldehyde per gallon of methanol consumed. Both are acceptable results.

What is claimed is:

1. A continuous process for the production of aqueous urea-formaldehyde solutions having a mol ratio of formaldehyde to urea ranging from about 4.0 to about 6.0 and having a total solids content ranging from about 65% to about 85% by weight comprising (A) introducing the gases from a formaldehyde converter into the bottom of a single formaldehyde absorber column and (B) allowing said gases to pass upwardly through said column while (C) simultaneously feeding an aqueous solution of urea containing from about 40% to about 80% by weight of urea into the top stage of said column and (D) allowing said aqueous solution of urea to at least partially react with the $CH_2O$ in said gases to form an aqueous solution of low molecular weight urea-formaldehyde addition products while flowing down said column from stage to stage at a temperature ranging from about 25° C to about 80° C while (E) simultaneously feeding a dilute aqueous solution of base into said column at a multiple of points such that the pH of said aqueous solution of methylol-ureas is maintained at a pH ranging from about 6.0 to 9.0 and (F) collecting said aqueous solution of methylol-ureas in the bottom of said column (G) circulating a portion of said aqueous solution of urea-formaldehyde addition products from the bottom of said column back into said column at a point above the last point where the dilute aqueous base is being fed into said column and above the point where said gases are being introduced but below the top stage of said column (H) continuously removing the remainder of said aqueous solution of urea formaldehyde addition products from the bottom of the said column (I) while continuing to feed said aqueous solution of urea into the top stage of said column while (J) continuing to introduce said gases into the bottom of said column.

2. A continuous process for the production of aqueous urea formaldehyde solutions having a mol ratio of formaldehyde to urea ranging from about 4.0 to about 5.0 and having a total solids content ranging from about 72% to about 78% by weight comprising (A) continuously introducing the gases coming from a methanol oxidation converter for the production of formaldehyde into the bottom of a single formaldehyde absorber column containing from about 20 bubble-cap trays to about 30 bubble-cap trays numbered from 1 beginning with the bottom tray and equipped with internal cooling coils on each tray (B) allowing said gases to pass upwardly from below the first tray through said column while (C) simultaneously feeding an aqueous solution of urea containing from about 45% to about 60% by weight of urea and from about 55% to about 40% by weight of water at a temperature ranging from about 25° C to about 70° C continuously into the top tray of said column and (D) allowing said aqueous solution of urea to at least partially react with the $CH_2O$ in said gases on each tray to form an aqueous solution of low molecular weight methylol ureas solution while flowing down said column from tray to tray while maintaining a tray temperature ranging from about 50° C to about 70° C for the bottom tray and from about 25° C to about 50° C for the top tray while (E) simultaneously feeding a dilute aqueous solution of base into said column at a multiple of points such that the pH of said aqueous solution of urea formaldehyde addition products is maintained at a pH ranging from about 7.0 to about 8.5 (F) collecting said aqueous solution of urea formaldehyde addition products in the bottom of said column (G) circulating a portion of said aqueous solution of urea formaldehyde addition products from the bottom of said column back into said column at a single point ranging from tray 4 to tray 8 (H) continuously removing the remainder of said aqueous solution of urea formaldehyde addition products from the bottom of said column while (I) continuing to feed said aqueous solution of urea onto the top tray of said column while (J) continuing to introduce said gases into the bottom of said column.

3. The process according to claim 2 wherein the aqueous solution of urea is prepared in a separate reaction vessel and stored at a temperature ranging from about 35° C to about 70° C until introduced onto the top tray of said column.

4. The process according to claim 2 wherein said column contains 25 to 30 bubble-cap trays.

5. The process according to claim 2 wherein the temperature of the bottom tray is about 55° C to about 70° C and the temperature of the top tray ranges from about 35° C to about 55° C.

6. The process according to claim 2 wherein the dilute aqueous solution of base is a 5% to 18% by weight solution of sodium hydroxide.

7. The process according to claim 2 wherein the dilute aqueous solution of base is fed onto trays 3, 15 and the top tray.

8. The process according to claim 2 wherein a portion of said aqueous solution of urea formaldehyde addition products is circulated from the bottom of said column back into said column onto tray 5.

9. The process according to claim 2 wherein the absorber contains ballast trays instead of bubble-cap trays.

10. The process according to claim 2 wherein the absorber contains sieve trays instead of bubble-cap trays.

11. The process according to claim 2 wherein the total solids content of the aqueous urea-formaldehyde solution ranges from about 75% to 77% by weight.

* * * * *